(12) United States Patent
Stiesdal

(10) Patent No.: US 7,990,113 B2
(45) Date of Patent: Aug. 2, 2011

(54) METHOD FOR SMOOTHING ALTERNATING ELECTRIC CURRENT FROM A NUMBER OF POWER GENERATING UNITS AND WIND POWER PLANT INCLUDING A NUMBER OF WIND MILLS WITH VARIABLE ROTATIONAL SPEED

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 12/223,490

(22) PCT Filed: Dec. 11, 2006

(86) PCT No.: PCT/EP2006/069554
§ 371 (c)(1),
(2), (4) Date: Nov. 18, 2008

(87) PCT Pub. No.: WO2007/087929
PCT Pub. Date: Aug. 9, 2007

(65) Prior Publication Data
US 2009/0267419 A1 Oct. 29, 2009

(30) Foreign Application Priority Data
Feb. 3, 2006 (EP) .................................. 06002276

(51) Int. Cl.
*H02P 9/04* (2006.01)
(52) U.S. Cl. ............ 322/29; 322/27; 322/332; 307/271; 307/272
(58) Field of Classification Search .................... 322/29, 322/28, 27, 36 R, 32; 323/24; 307/271, 307/272, 273; 700/286, 96; 702/61; 703/2, 12
See application file for complete search history.

(56) References Cited

U.S. PATENT DOCUMENTS

| 6,285,572 | B1 | 9/2001 | Onizuka et al. | |
| 7,501,798 | B2 * | 3/2009 | Laubrock et al. | 322/32 |
| 7,683,587 | B2 * | 3/2010 | Inaba et al. | 322/20 |
| 7,705,568 | B2 * | 4/2010 | Taniguchi | 322/59 |
| 2001/0056330 | A1 | 12/2001 | Wills | |

(Continued)

FOREIGN PATENT DOCUMENTS
CN 1559097 A 12/2004

(Continued)

OTHER PUBLICATIONS

Asari M. et al; A Study on Smoothing Effect on Output Fluctuation of Distributed Wind Power Generation; IEEE/PES Transmission and distribution Conference and Exhibition 2002: Asia Pacific. Yokohama, Japan, Oct. 6-10, 2002. vol. 1 F 3; p. 938-943;; NewYork; 0-7803-7525-4; Others; 2002; US.

(Continued)

*Primary Examiner* — T C Patel
*Assistant Examiner* — Iraj A Mohandesi

(57) ABSTRACT

A method and a wind power plant are provided for smoothing alternating electric current from a number of power generators. Generators are electrically connected to an electric network. Each power generator includes a transformer with pulse width modulation for converting direct current to pulse width modulated alternating current for feeding to the network. The time for feeding the pulses of the pulse width modulated alternating current is different for each generator in order to achieve a more even alternating current as a sum of respective outputs of alternating current from the generators.

12 Claims, 2 Drawing Sheets

U.S. PATENT DOCUMENTS

2004/0174720 A1     9/2004    Kurokami et al.

FOREIGN PATENT DOCUMENTS

| | | |
|---|---|---|
| EP | 1047179 A1 | 10/2000 |
| EP | 1455437 A2 | 9/2004 |
| WO | 03030329 A1 | 4/2003 |

OTHER PUBLICATIONS

McErney G. et al; The Statistical Smoothing of Power Delivered to Utilities by Multiple Wind Turbines; IEEE Transactions on Energy Conversion, IEEE Service Center, vol. 7, No. 4, Dec. 1, 1992, pp. 644-647; Piscataway, NJ, US; 0885-8969; Others; 1992; US.

* cited by examiner

METHOD FOR SMOOTHING ALTERNATING ELECTRIC CURRENT FROM A NUMBER OF POWER GENERATING UNITS AND WIND POWER PLANT INCLUDING A NUMBER OF WIND MILLS WITH VARIABLE ROTATIONAL SPEED

CROSS REFERENCE TO RELATED APPLICATIONS

This application is the US National Stage of International Application No. PCT/EP2006/069554 filed Dec. 11, 2006 and claims the benefit thereof. The International Application claims the benefits of European application No. 06002276.1 EP filed Feb. 3, 2006, both of the applications are incorporated by reference herein in their entirety.

FIELD OF THE INVENTION

The present invention concerns a method for smoothing alternating electric current from a number of power generators with pulse width a modulated frequency converter, for example windmills with variable rotational speed. The invention also concerns use of the method for windmills and electricity generating wave power plants. In addition, the invention concerns a wind power plant with a number of windmills.

BACKGROUND OF THE INVENTION

Wind power plants with windmills operating with variable speed are only indirectly connected to the electricity network, which means that the generator has its own AC network where the frequency can vary. In order to transmit electricity to the electricity network, the AC current from the generator is converted into DC, and then to AC again, where the latter AC is adapted to the frequency of the electric network.

When transforming PC into AC, typically a pulse width modulated (PWM) frequency converter is applied, however resulting in uneven current having abrupt steps or discontinuities in voltage and amperage. In order to smooth this current for feeding into the network, AC filters with coils and condensers, so-called RCL filters, are used. In spite of the smoothing action of the filter, usually there will still be distortions of the AC in the network, depreciating the quality of the current. Furthermore, this smoothing provided by the filter implies consumption of power from the network to some extent. This is even more pronounced the more unstable the network receiving the current is functioning. Power absorption from the network during the smoothing results in reduced net transmission of power from the generator to the network. For the windmill owner, this entails reduced profits, which is a great disadvantage.

DESCRIPTION OF THE INVENTION

It is therefore the purpose of the invention to provide a method which does not have the above mentioned disadvantages.

This purpose is achieved by a method for smoothing alternating electric current from a number of Power generating units, for example windmills with variable rotational speed, where the generating units are electrically connected to an electric network, and where each power generating unit includes a transformer with pulse width modulation for converting direct current to pulse width modulated alternating current for feeding to the network, and where the times for feeding the Pulses of the pulse width modulated alternating current are different for respective generating units in order to achieve a more even alternating current as a sum of respective outputs of alternating current from the generating units.

The method according to the Invention may find application in a windmill farm where the current pulses of individual windmills are fed time-delayed into the network, where the pulse width is typically made dependent on the time of feeding. This provides smoothing of the current so that it has a better quality for feeding into the electricity network, and therefore the filter absorbs less power from the network. Besides, the RCL filter for smoothing can be dimensioned much smaller, entailing a further saving for the owner of the windmill, as the filter is an expensive component in the converter.

In order to calibrate the time of feeding the Pulses, the time of feeding may advantageously be determined from a GPS time signal. GPS Signals are controlled very accurately in time, making them suited as calibration signals. However, other types of calibration signals are possible.

It is not decisive that the feeding frequencies of the different generating units are identical. Alternatively, the times of feeding for the pulses of respective generating units may be determined from feeding frequencies which differ from generating unit to generating unit. Such frequencies may be fixed, but varying frequencies may also be envisaged in application for preventing strong resonances. In addition or alternatively, a random generator may be employed in order to counteract resonances.

The Invention thus also provides a wind power plant with a number of windmills with variable rotational speed, where the windmills are connected to an electric network, and where each windmill includes a generator for producing an electric current and a converter for pulse width modulated conversion of direct current to pulse width modulated alternating current for feeding to the network, where for each windmill, a time controlling means is provided determining the time for feeding the pulses of the pulse width modulated alternating current, where the time controlling means are programmed for feeding the pulses from the various windmills at different times in order to achieve a more even alternating current.

The time control means for calibration may have GPS receivers for receiving the time signal from GPS transmitters.

Even though the method has been explained above with regard to windmills, the method may also find application in other current producing plants, e.g. in connection with utilising wave power in the sea.

SHORT DESCRIPTION OF THE DRAWING

The invention is explained in more detail in the following with reference to the drawing, wherein.

DETAILED DESCRIPTION

Figure 1:
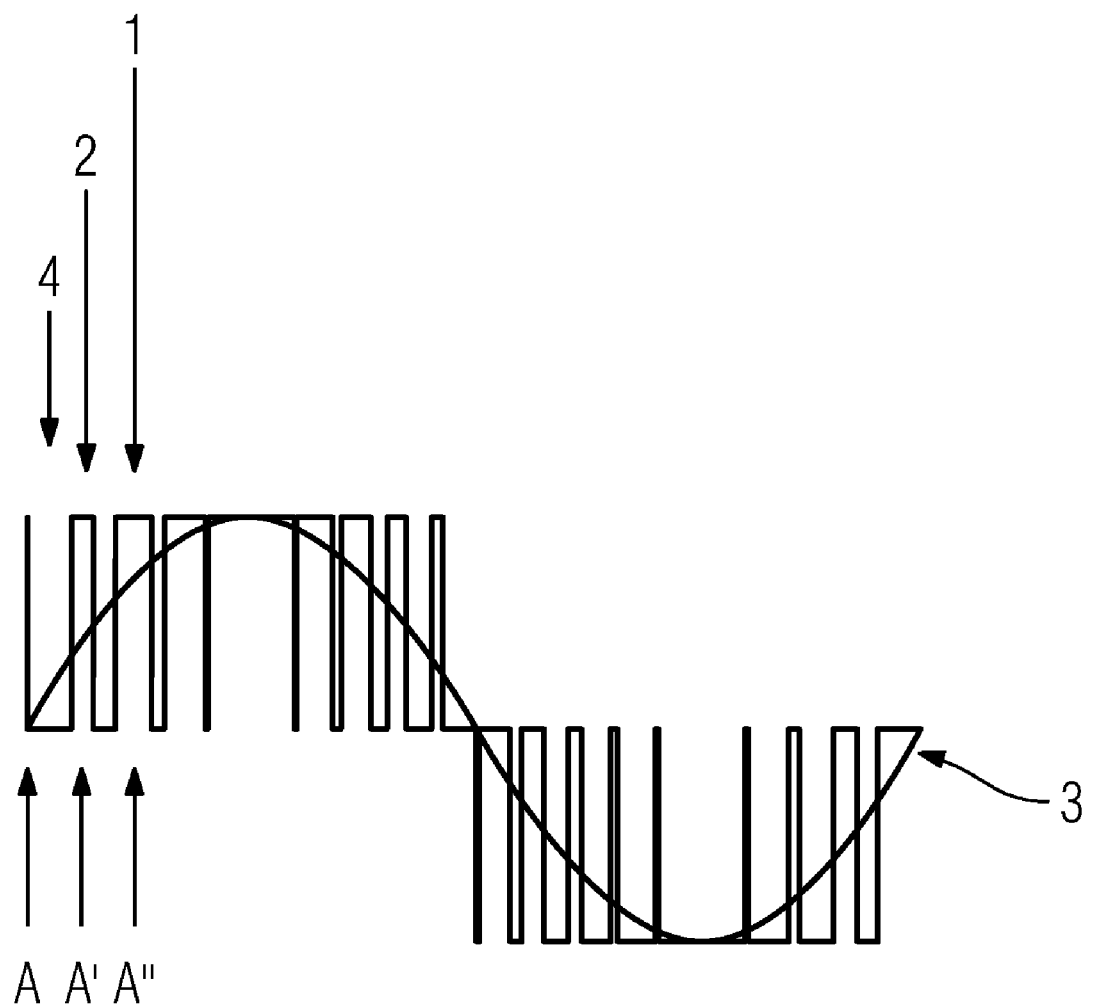
FIG. 1 shows a pulse width modulated approximation of a sine curve.

A sinusoidal signal 3 is shown an FIG. 1, and which is approximated by pulse width modulated pulses 1, 2. Pulses 1, 2 are formed with different widths into successive equidistant points in time A, A', A", where the times are determined by a predetermined frequency, which is typically a multiple of 50 Hz, e.g. 2500 Hz. The width of the pulses 1, 2 represent the strengths of the pulses. By changing the strengths of the pulses 1, 2, the sinusoidal current signal 3 is approximated.

Figure 2:
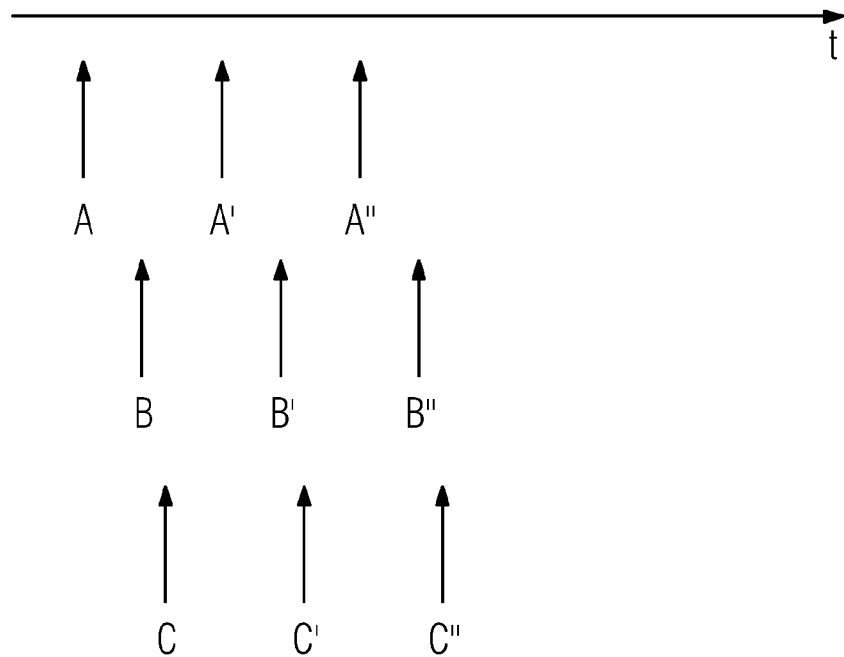
FIG. 2 illustrates three series of times for feeding pulses.

On FIG. 2 is depicted a timeline t and the three times A, A', A" for the current pulses illustrated on FIG. 1. It is assumed that the current pulses A, A', A" stem from a first series of pulse width modulated current pulses originating from a generator of a first windmill. Correspondingly, a second series of pulse width modulated current pulses B, B', B" from a second windmill and C, C', C" from a third windmill are fed in. The times of feeding for the A, B and C series are different, causing irregularities in the current to be smoothed because gaps 4, as illustrated on FIG. 1, are filled by current pulses from other generators.

Each series of pulses A, B, C represent a current signal, cf. that shown an FIG. 1. In order for these different current signals to be fed in phase, the widths of the pulses A, B, C are adapted to the strength of the desired current signal at the given point in time. The current pulses A, B and C thus have different widths.

Figure 3:
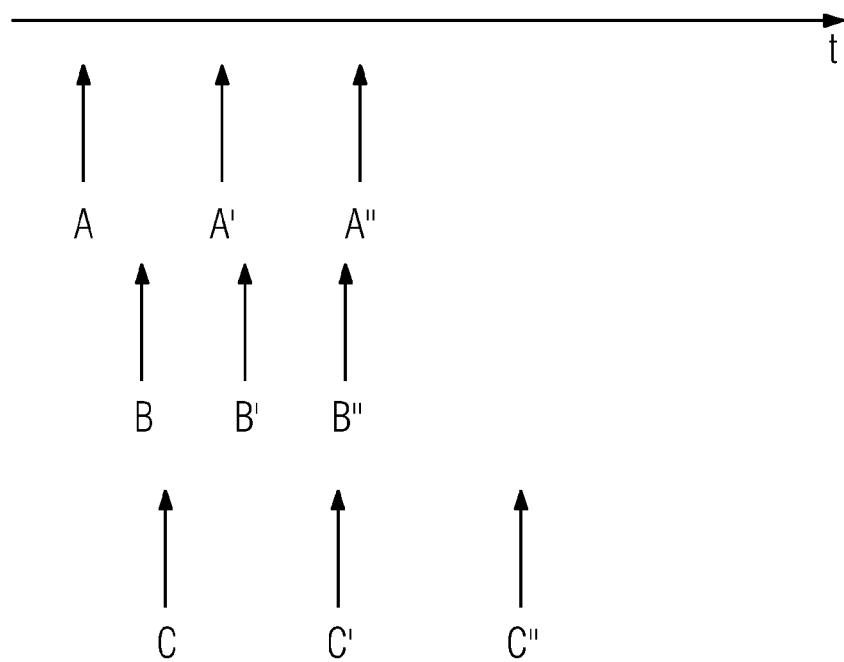
FIG. 3 illustrates three series of times with different frequencies for feeding the pulses.

On FIG. 3 is illustrated an alternative embodiment. In this case, the times in the series of pulses A, B and C are equidistant in each series, but the frequencies of series A, B and C are different when comparing the series. The B series has smaller time intervals between the pulses B, B' and B" than the A series has between the pulses A, A' and A", and therefore a higher feeding frequency than the A series. However, the C series has larger time intervals between the pulses C, C' and C" than the A series, and thus a lower feeding frequency.

Even though it is stated above that the current pulses are equidistant in time, this is not decisive for the invention. The current pulses may thus also be fed at variable points in time. Moreover, random generators may be used for determining the feeding times in order to counteract resonance formation. If the times are not equidistant, it may occur that two succeeding current pulses in the same series are having the same width. In principle, it is also possible to operate with current pulses with constant width, but where the lengths of the time intervals vary. It is only important that the current signal produced by the current pulses is provided with the desired form with optimal quality in the end.

The invention claimed is:

1. A method for smoothing alternating electric current from a plurality of power generating units, where the power generating units are electrically connected to an electric network, comprising:

converting direct current to pulse width modulated alternating current for feeding to the network, the conversion by a transformer with pulse width modulation and which is included in each power generating unit, wherein times for feeding pulses of the pulse width modulated alternating current are different for respective power generating units in order to achieve a more even alternating current as a sum of respective outputs of alternating current from the power generating units.

2. The method according to claim 1, wherein at least one of the power generating units is a windmill with variable rotational speed.

3. The method according to claim 1, wherein power generating units are part of a wind power plant.

4. The method according to claim 1, wherein power generating units are part of a water wave power plant.

5. The method according to claim 1, wherein the pulse width depends on the time of feeding.

6. The method according to claim 5, wherein the time of feeding is determined from a GPS time signal.

7. The method according to claim 5, wherein the times of feeding for the respective power generating units are determined by respective feeding frequency, wherein the feeding frequencies are different for each power generating unit.

8. The method according to claim 5, wherein the times of feeding for the respective generating units are determined by respective feeding frequency, wherein the feeding frequency for each generating unit is varying.

9. The method according to claim 1, wherein the time of feeding is determined from a GPS time signal.

10. The method according to claim 1, wherein the times of feeding for the respective power generating units are determined by respective feeding frequency, wherein the feeding frequencies are different for each power generating unit.

11. The method according to claim 1, wherein the times of feeding for the respective generating units are determined by respective feeding frequency, wherein the feeding frequency for each generating unit is varying.

12. The method according to claim 1, wherein the times of feeding for the respective power generating unit involves a signal from a random generator.

* * * * *